United States Patent [19]

Camberlin

[11] Patent Number: 4,973,649
[45] Date of Patent: Nov. 27, 1990

[54] HINDERED DIAMINE/IMIDO PREPOLYMERS

[75] Inventor: Yves Camberlin, Caluire, France

[73] Assignee: Rhone-Poulenc Chimie, Courbevoie, France

[21] Appl. No.: 319,306

[22] Filed: Mar. 3, 1989

[30] Foreign Application Priority Data

Mar. 3, 1988 [FR] France .................. 88 02986

[51] Int. Cl.$^5$ .............................................. C08G 8/04
[52] U.S. Cl. ...................................... 528/148; 428/413; 428/473.5; 528/98; 528/107; 528/109; 528/112; 528/113; 528/159; 528/162; 528/163; 528/321; 528/322
[58] Field of Search ............... 428/473.5, 413; 528/98, 528/107, 109, 112, 113, 148, 159, 162, 163, 321, 322

[56] References Cited

FOREIGN PATENT DOCUMENTS 2094607  2/1972  France .
2427346 12/1979  France .
2589869  5/1987  France .

*Primary Examiner*—Morton Foelak
*Attorney, Agent, or Firm*—Burns, Doane, Swecker & Mathis

[57] ABSTRACT

Novel thermosetting imido prepolymers having low melt viscosity, well adapted for the production, e.g., of preimpregnated shaped articles, are copolymerizates of at least one N,N'-bismaleimide; at least one hindered diprimary diamine, e.g., 4,4'-diamino-3,3',5,5'-tetraalkyl-diphenyl-methane or 1,3-diamino- or 1,4-diaminotrialkylbenzene; at least one comonomeric heterocycle, e.g., a vinylpyridine, N-vinyl-2-pyrrolidone, allyl isocyanurate, vinyltetrahydrofuran, and/or an imidazole compound; and at least one comonomeric (meth)acrylate.

14 Claims, No Drawings

HINDERED DIAMINE/IMIDO PREPOLYMERS

BACKGROUND OF THE INVENTION

1. Field of the Invention

The present invention relates to novel thermosetting imido prepolymers, and, more especially, to low melt viscosity imido prepolymers comprising the copolymerizates of at least one N,N'-bismaleimide, at least one hindered diprimary diamine, at least one comonomeric heterocycle, and at least one comonomeric acrylate.

2. Description of the Prior Art

In published French Application FR-A-No. 2,608,613, assigned to the assignee hereof, polymers containing imide groups are described which comprise the product of the reaction, at a temperature ranging from 50° C. to 300° C., among at least:

(a) one N,N'-bisimide or a combination of several bisimides having the formula:

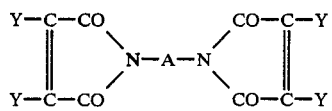

Wherein each of the symbols Y, which may be identical or different, is H, CH$_3$ or Cl; the symbol A is a divalent radical selected from among the following radicals: cyclohexylenes; phenylenes; 4-methyl-1,3-phenylene-; 2-methyl-1,3-phenylene; 5-methyl-1,3-phenylene; 2,5-diethyl-3-methyl-1,4-phenylene-; and the radicals of the formula:

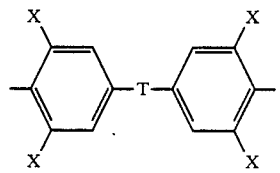

wherein T is a single valence bond or one of the atoms or

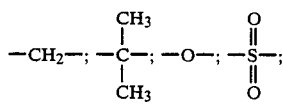

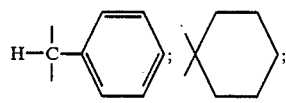

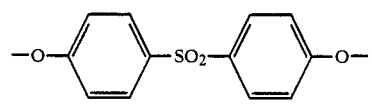

and each of the symbols X, which may be identical or different, is a hydrogen atom or a methyl, ethyl, propyl or isopropyl radical; and (b) one or more hindered biprimary diamine(s) selected from among:

(i) the species corresponding to the general formula:

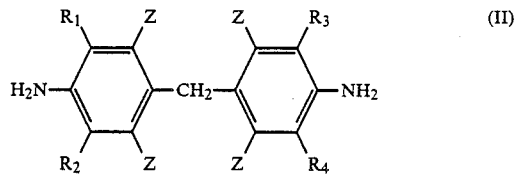

wherein each of the symbols R$_1$, R$_2$, R$_3$ and R$_4$, which may be identical or different, is a methyl, ethyl, propyl or isopropyl radical; and each of the symbols Z, which may be identical or different, is a hydrogen atom or a chlorine atom; and (ii) the species corresponding to the general formula:

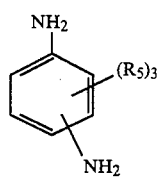

wherein the amino radicals are in a meta- or para-position with respect to one another; and each of the symbols R$_5$, which may be identical or different, is a methyl, ethyl, propyl or isopropyl radical.

The steric hindrance in the diamines (b) results in weak reactivity of the components of the polymerization mixture, which permits the gelling of the prepolymers and the complete hardening of the resins to be achieved after longer periods of time than are required in the case of polyaminobismaleimides produced from unhindered diamines. This lower reactivity of the components of the polymerization mixture may be of particular interest, on one hand, for the production of molded items by simple casting of the prepolymers, on the other hand, for the production of shaped articles by the filament winding technique and, finally, for the production of preimpregnated intermediate articles using the technique known as "hot melt", in which fibrous materials are impregnated with molten prepolymers.

Furthermore, the polyaminobismaleimides according to the '613 French Application are prepared without taking any particular precautions with regard to health, hygiene and safety, since the hindered diamines (b) that are used do not present the toxicity risks generally associated with unhindered diprimary aromatic diamines.

The aforementioned French application also provides that in preparing the polymers, optional reactant (or reactants) (c) and/or (d) may be added to the reaction mixture in addition to the reactants (a) and (b), with (c) being one or more monomer(s) other than a bisimide of formula (I) and having one or more carbon-carbon polymerizable double bond(s), and (d) being an imidazole compound. Reactant (c) is added when some of the rheological characteristics and/or mechanical properties of the polymers require modification, whereas reactant (d) is added when the reactivity of components (a), (b) and, when appropriate, (c) in the mixture, has to be increased.

Over the course of investigation of the polyaminobismaleimides for particular use in the production of shaped articles by the filament winding technique and the solvent-free preimpregnation technique, a serious need has arisen for thermosetting polyaminobismaleimide prepolymers, the preparation of which requires no particular precautions with regard to health, hygiene and safety and which have such viscosities that the values and changes over time of which are perfectly suitable for the types of conversion involved in filament winding and hot melt impregnation operations.

SUMMARY OF THE INVENTION

Accordingly, a major object of the present invention is the provision of novel thermosetting prepolymers comprising the copolymerizates of the reactants (a) and (b) of the abovementioned '613 French Application with an appropriate reactant (c) and/or a reactant (d), in the presence of a supplementary acrylate reactant (e).

Briefly, the present invention features novel thermosetting imido prepolymers having a melt viscosity, measured under the conditions described below, which ranges from 0.1 Pa.s to 500 Pa.s, comprising the copolymerizates, at a temperature ranging from 50° C. to 180° C., of:

(a) one or more bismaleimide(s) corresponding to the formula (I) and having the same variable definitions as given above respecting this formula;

(b) one or more hindered diamine(s) corresponding to the formulae (II) and (III) and to the definitions given above respecting these formulae;

one or more reactant(s) (c) and/or (d), with (c) itself comprising one or more substituted heterocyclic compound(s) selected from among vinylpyridines, 2-N-vinylpyrrolidone, allyl isocyanurate, vinyltetrahydrofuran; and (d) comprising an imidazole compound; and (e) an acrylate comprising one or more compound(s) of the general formula:

$$(CH_2=CR_6-CO-)_n B \qquad (IV)$$

wherein the symbol $R_6$ is a hydrogen atom or a methyl radical; n is an integer or fraction at least equal to 1 and at most equal to 8; and the symbol B is an organic radical of valency n derived from a saturated linear or branched chain aliphatic radical having 1 to 30 carbon atoms which may contain one or more oxygen bridge atoms and/or one or more free hydroxyl radicals, an aromatic radical (of aryl or arylaliphatic type) having 6 to 150 carbon atoms and including a benzene nucleus, which may have one to three substituent alkyl radicals having 1 to 5 carbon atoms, or several benzene nuclei, optionally substituted as indicated above, linked together by a single valency bond, an inert group or an alkylene radical having 1 to 3 carbon atoms, and said aromatic radical optionally containing one or more oxygen bridge atoms and/or one or more free hydroxyl radicals at various sites in its structure, the free valency (or valencies) in the aromatic radical B being optionally borne on an aliphatic chain carbon atom and/or a carbon atom in a benzene nucleus.

More particularly according to the present invention, the maleimide compounds noted in French Application FR-A-No. 2,608,613, i.e.:
N,N'-meta-phenylenebismaleimide;
N,N;-para-phenylenebismaleimide;
N,N'-(4,4'-diphenylmethane)bismaleimide;
N,N'-(4,4'-diphenyl ether)bismaleimide;
N,N'-(4,4'-diphenyl sulfone)bismaleimide;
N,N'-(1,4-cyclohexylene)bismaleimide;
N,N'-[4,4'-(1,1-diphenylcyclohexane)]bismaleimide;
N,N'-[4,4'-(2,2-diphenylpropane)]bismaleimide;
N,N'-(4,4'-triphenylmethane)bismaleimide;
N,N'-(2-methyl-1,3-phenylene)bismaleimide;
N,N'-(4-methyl-1,3-phenylene)bismaleimide; and
N,N'-(5-methyl-1,3-phenylene)bismaleimide,
are representative specific examples of the bisimides (a) of formula (I).

These bismaleimides may be prepared according to the processes described in U.S. Pat. No. 3,018,290 and British Patent GB-A-No. 1,137,290. In carrying out the present invention, it is preferred to use N,N'-(4,4'-diphenylmethane)bismaleimide alone or mixed with N,N'-(2-methyl-1,3-phenylene)bismaleimide, N,N'-(4-methyl-1,3-phenylene)bismaleimide and/or N,N'-(5-methyl-1,3-phenylene)bismaleimide.

Exemplary of the hindered diamines (b) of formulae (II) and (III) also as indicated in the abovementioned '613 French Application, the following compounds are particularly representative:
4,4'-diamino-3,3',5,5'-tetramethyldiphenylmethane;
4,4'-diamino-3,3',5,5'-tetraethyldiphenylmethane;
4,4'-diamino-3,5-dimethyl-3',5'-diethyldiphenylmethane;
4,4'-diamino-3,3'-diethyl-5,5'-dimethyldiphenylmethane;
4,4'-diamino-3,3',5,5'-tetraisopropyldiphenylmethane;
4,4'-diamino-3,3'-diisopropyl-5,5'-dimethyldiphenylmethane;
4,4'-diamino-2,2'-dichloro-3,3',5,5'-tetraethyldiphenylmethane;
1,3-diamino-2,4-diethyl-6-methylbenzene;
1,3-diamino-2-methyl-4,6-diethylbenzene; and mixtures of the above.

These hindered diamines may be prepared according to the processes described in British Patent GB-A-No. 852,651 and U.S. Pat. No. 3,481,900. According to the present invention, it is preferred to use 4,4'-diamino-3,3',5,5'-tetraethyldiphenylmethane, 4,4'-diamino-3,3'-diethyl-5,5'-dimethyldiphenylmethane, and mixtures thereof.

The amounts of N',N-bisimide(s) (a) and hindered diamine(s) (b) are selected such that the ratio r:

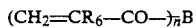
number of moles of bisimide(s) (a) / number of moles of diamine(s) (b)

ranges from 1.1/1 to 20/1, and preferably from 2/1 to 5/1.

The reactant (c), the presence of which is either compulsory in the absence of the imidazole compound (d), or optional when (d) is present, is used in amounts representing generally less than 60% and, preferably, 2 to 20% of the total weight of the reactants (a)+(b).

The imidazole compound (d), the presence of which is either compulsory in the absence of the reactant (c), or optional when (c) in fact is present, corresponds to the general formula given in French Application FR-A-No. 2,608,613, that is to say:

wherein each of $R_7$, $R_8$, $R_9$ and $R_{10}$, which may be identical or different, is a hydrogen atom, an alkyl or alkoxy radical having 1 to 20 carbon atoms, vinyl, phenyl, nitro; $R_9$ may, together with $R_{10}$ and the carbon atoms from which these radicals depend, form a single ring member, such as, for example, a benzene ring; $R_7$ may also be a carboxyl group bonded to a second such imidazole ring.

The following are particularly representative of the imidazole compounds (d): imidazole or glyoxaline, 1-methylimidazole, 2-methylimidazole, 1,2-dimethylimidazole, 1-vinylimidazole, 1-vinyl-2-methylimidazole, benzimidazole, carboxydiimidazole.

When present, the imidazole compound is used in catalytic amounts. Depending on the nature of the imidazole compound and the rate of polymerization required at the production stage, the imidazole compound is used in proportions ranging from 0.01 to 1% by weight of the overall weight of the reagents (a)+(b)+ where appropriate (c) and, preferably, from 0.02 to 0.5%.

The following are representative acrylate reactants (e): (e1) mono(meth)acrylates corresponding to the formula (IV) wherein n=1; and B is a monovalent organic radical of the formula:

   (VI)

wherein B is a linear or branched chain alkyl radical having 1 to 6 carbon atoms or a phenyl radical; and m is an integer equal to Zero, 1, 2, 3, 4 or 5;

(e2) di(meth)acrylates Corresponding to the formula (IV) wherein n =2; and B is a divalent organic radical of the formula:

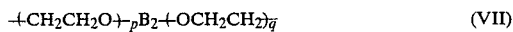   (VII)

wherein $B_2$ is a divalent, linear or branched chain alkylene radical having 2 to 9 carbon atoms, optionally containing one or more oxygen bridge(s), or a radical of formula:

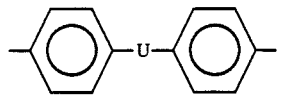

wherein the symbol U is a single valence bond or one of the atoms or groups:

—CH$_2$—, —CH$_2$CH$_2$—, —CH(CH$_3$)CH$_2$—,
—C(CH$_3$)$_2$—, —O—, —SO$_2$—;

each of the symbols p and q, which may be identical or different, is an integer equal to Zero, 1, 2, 3, 4 or 5;

(e3) tri- and tetra(meth)acrylates corresponding to the formula (IV) wherein n=3 or 4; and B is a trivalent or tetravalent organic radical derived from a linear or branched chain saturated aliphatic radical, having 3 to 20 carbon atoms and optionally containing one or more oxygen bridge(s) and/or one or more free hydroxyl function(s);

(e4) epoxy novolak (meth)acrylates which, while corresponding to the formula (IV), are here represented by the following formula:

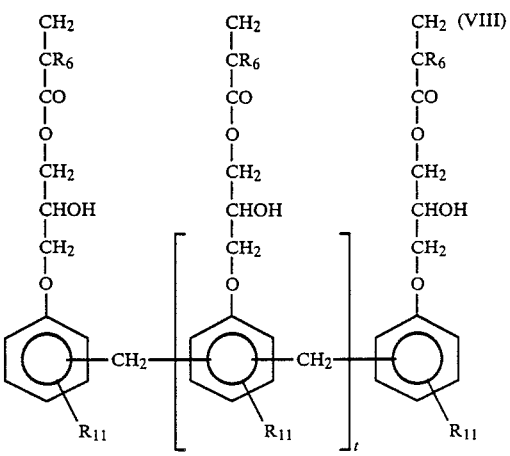

wherein the symbol $R_6$ is as defined above with regard to the formula (IV); the symbol $R_{11}$ is a hydrogen atom or a methyl radical; and t is an integer or a fraction ranging from 0.1 to 7;

(e5) mixtures of several acrylates and/or methacrylates of the same type [(e1), (e2), (e3) or (e4)] with each other, or mixtures of one or more acrylate(s) and/or methacrylate(s) of the same type with one or more acrylate(s) and/or methacrylate(s) of a different type.

The following are specific examples of particularly representative (e1) acrylate reactants: methyl mono(meth)acrylates, (monooxyethylated)phenol mono(meth)acrylates; dioxyethylated)phenol mono(meth)acrylates.

The following are specific examples of particularly representative (e2) acrylate reactants: ethylene glycol di(meth)acrylates; 1,4-butanediol di(meth)acrylates; 1,6-hexanediol di(meth)acrylates; tripropylene glycol di(meth)acrylates; di(meth)acrylates of the following diphenols, di(mono- or polyoxyethylated) or otherwise: 4,4'-dihydroxydiphenylmethane, bisphenol A, 4,4'-dihydroxydiphenyl ether and particularly di(monooxyethylated) bisphenol A di(meth)acrylates or di(dioxyethylated) bisphenol A di(meth)acrylates [cf. formula (VII) wherein $B_2$ represents the radical:

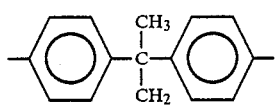

and p=q=1 or 2].

The following are specific examples of particularly representative (e3) acrylate reactants: 1,2,4-butanetriol tri(meth)acrylates; 1,2,6-hexanetriol tri(meth)acrylates, trimethylolpropane tri(meth)acrylates; pentaerythritol tri(meth)acrylates; pentaerythritol tetra(meth)acrylates.

The epoxy novolak (meth)acrylates (e4) are known products, some of which are commercially available. They may be prepared by reacting (meth)acrylic acids with a novolak-type epoxy resin, the latter being the product of the reaction of epichlorohydrin with phenol/formaldehyde polycondensates; $R_{11}$ in the formula (VIII) given above is then a hydrogen atom, or with cresol/formaldehyde polycondensates; $R_{11}$ in the formula is then a methyl radical. These oligomeric polyacrylates (e4) together with a process for preparing them are described, for example, in U.S. Pat. No. 3,535,403.

The following are specific examples of particularly representative (e4) acrylate reactants: acrylates of epoxy novolaks of formula (VIII) wherein $R_6$ and $R_{11}$ represent a hydrogen atom and t is an integer or a fraction ranging from 0.1 to 5.

The following are specific examples of particularly representative (e5) acrylate reactants: mixtures of (e4) epoxy novolak (meth)acrylates with up to 30% by weight of the weight of the (e4) +(e3) mixture of a triacrylate and/or a trimethacrylate corresponding to the definitions given above with regard to the acrylate reactant (e3), and in particular mixtures of the immediately abovementioned particularly suitable epoxy novolak acrylates with up to 25% by weight relative to the weight of the mixture, of a particularly suitable triacrylate and/or a trimethacrylate selected from among those mentioned immediately above.

In a particularly preferred embodiment of the invention, the acrylate reactant (e) is selected from among: di(monooxyethylated) bisphenol A di(meth)acrylates, di(dioxyethylated) bisphenol A di(meth)acrylates; acrylates of epoxy novolaks of formula (VIII) wherein $R_6$ and $R_{11}$ are each a hydrogen atom and t is an integer or a fraction ranging from 0.1 to 5, these compounds being used either alone or mixed with not more than 25%, by weight of the weight of the mixture, of trimethylolpropane triacrylate.

The acrylate reactant (e) comprising one or more compound(s) of formula (IV) is used in amounts generally representing 1% to 60%, and preferably 5% to 30%, of the overall weight of the reagents (a)+(b)-+(e)+where appropriate (c).

Various adjuvants may be incorporated in the prepolymers according to the invention. These adjuvants, which are commonly used and well known to this art, may, for example, be stabilizers or degradation inhibitors, lubricants or mold release agents, colorants or pigments, powdered or particulate fillers such as silicates, carbonates, kaolin, chalk, pulverized quartz, mica or ballotine. Adjuvants may also be incorporated to modify the physical structure of the final product, such as, for example, blowing agents or fibrous reinforcing agents, such as, particularly, fibrils of carbon, polyimide, aromatic polyamides and whiskers.

The preparation process is such that the ready-to-use prepolymer has enough flexibility and thin-layer adhesion.

First, the bismaleimide(s) is (or are) intimately admixed with the amino reactant (b). To avoid a premature homopolymerization of the maleimides, which would result in an excessively viscous resin, the mixture of (a)+(b) is melted, in the absence of the optional imidazole compound (d), under stirring, and at a temperature not exceeding the melting point of the highest melting maleimide and generally ranging from 50° C. to 180° C. (stage 1).

Reactant(s) (c) and/or (d) is (are) then added to the molten mixture, which is stirred and maintained at a temperature—identical with or different from that used in the preceding stage—of from 50° C. to 180° C., and the reaction mixture is permitted to react, under stirring, for a period of time ranging from 1 minute to 20 minutes (stage 2).

When this time has elapsed, the reactant (e) is quickly introduced into the reaction mixture, still stirred and maintained at the temperature of the preceding stage of addition of the reactant(s) (c) and/or (d), and, once introduction of the reactant (e) is completed, the resulting prepolymer is immediately cast from the reactor in which it was prepared (stage 3).

The melt viscosity of the prepolymers obtained in this manner may easily be adjusted to the required value, from 0.1 Pa.s to 500 Pa.s, in particular by varying the nature and respective proportions of the reactants used, and also the temperature and duration of the various stages of the production process just mentioned. It is to be noted that the nature and proportions of the reactant(s) (c) and/or (d) exert a predominant influence on viscosity adjustment.

The operations that have just been described may not only be carried out in bulk, but also in the presence of variable amounts of a polar liquid such as for example: cresol, dimethylformamide, N-methylpyrrolidone, dimethylacetamide, methyl ethyl ketone, dioxane, cyclohexanone.

The prepolymers according to the invention may be used directly in the state of a homogeneous liquid, for example for impregnating conductors or for making molding by simple hot-casting. These prepolymers can also be used in powder form after cooling and grinding, for example to produce compression-molded items, optionally combined with fibrous or powdered fillers. The prepolymers may also be used in solution to prepare coatings, bonding agents, laminated materials whose framework may be formed from woven or nonwoven sheets, unidirectional elements or natural or synthetic staple fibers such as for example glass, boron, carbon, tungsten, silicon, polyamide-imide or aromatic polyamide filaments or fibers.

The prepolymers according to the present invention are of particular interest for the solvent-free production of pre-impregnated intermediate components (prepregs). Impregnation of fibrous material may be carried out by conventional techniques such as immersion, coating by means of a doctor blade or a curtain, or transfer impregnation. The transferable film and the preimpregnated components may be used directly or stored for future use; their properties are remarkably well preserved during cool storage at a temperature of from 0° to 10° C. The prepolymers used in this application preferably have a melt viscosity of from 4 Pa.s to 50 Pa.s.

The preimpregnated materials may be used to produce components of varied shapes and for various purposes in many industries, such as, for example, the aeronautical industry. These components, which may be rotary components, are obtained by laminating several preimpregnated layers onto a form or a support.

Crosslinking is then carried out under the usual technological conditions for composite materials, and in particular at temperatures ranging from 100° to 300° C.

Preimpregnated components may also be used to reinforce or repair damaged items.

However, components may also be designed according to the filament winding technique with or without a support, intended for the production of rotary components, a technique which is used, particularly, to fabricate components for the car and aeronautical industries. The prepolymers used in this technique preferably have a melt viscosity of from 0.1 Pa.s and 2 Pa.s.

In order to further illustrate the present invention and the advantages thereof, the following specific examples are given, it being understood that same are intended only as illustrative and in nowise limitative.

In said examples to follow, a certain number of checks were carried out. Similarly, various properties were measured. The operating procedures and/or the standards according to which these checks and measurements were carried out are indicated below:

Melt Viscosity of the Prepolymer in the Molten State

The melt viscosity noted herein was the dynamic viscosity of the prepolymer obtained at the moment of casting at the end of the preparation process, carried out in bulk; it was measured at 80° C. =/−0.1° C. with a RHEOMAT 30 viscometer made the CONTRAVES Company which had a moving part turning under a gradient of 13 s$^{-1}$; its value is expressed in Pa.s.

Softening Point of the Prepolymer

The softening point was taken as the approximate temperature at which a glass rod of 6 mm diameter easily penetrated a few mm into the prepolymer.

Glass Transition Temperature of the Hardened Polymer

The glass transition temperature (Tg) was the temperature at which the elastic modulus drops abruptly. It was determined from the graph of the variations of the elastic modulus with temperature, these variations having been measured by dynamic mechanical analysis by means of a DMA DUPONT model 982 apparatus, at a rate of temperature rise of 3° C./min. The test pieces were conditioned at a RH of 0 (Zero Relative Humidity), that is to say, they were placed in a desiccator over silica gel and dried for 24 hours at room temperature and $0.66-1.33 \times 10^2$ Pa before the measurements were carried out.

Flexural Mechanical Characteristics of the Hardened Polymer

The flexural modulus (Mf) and rupture strength (Rf) were determined using bar-type test pieces conditioned at an RH of 0, according to ASTM Standard D 790M. The results are expressed in MPa.

Mechanical Tensile Strength Characteristics of the Hardened Polymer

These were determined on dumbbell-type test pieces, conditioned at an RH of 0, according to ASTM Standard D 638 M.

Charpy Impact Strength of the Hardened Polymer

This was determined at 20° C. on unnotched bar-type test pieces measuring 80×10×4 mm, conditioned at an RH of 0, according to ASTM Standard D 256. The results are expressed in kJ/m$^2$.

EXAMPLE 1

The following materials were placed in a glass reactor equipped with an anchor-type stirrer, at room temperature:
(i) 80 g (0.223 mole) of N,N'-(4,4'-diphenylmethane) bismaleimide; and
(ii) 20 g (0.064 mole) of 4,4'diamino-3,3',5,5'-tetraethyl-diphenylmethane (the ratio r was equal to 3.48/1).

Stage 1: the reactor was immersed in a preheated oil bath at 160° C. and the mixture was stirred until the ingredients involved had melted completely and a homogeneous mass was obtained. This stage lasted 5 minutes.

Stage 2: the resulting molten mixture was cooled to 140° C. and 8 g of N-vinyl-2-pyrrolidone were added, then the mix was left to react while being stirred for 8 minutes.

Stage 3: 28 g of di(dioxyethylated) bisphenol A diacrylate (available commercially under the registered trademark EBECRYL 150 from the UCB Company) were then added to the reaction mass, while still maintaining a temperature of 140° C. and under stirring, and the reaction mass was immediately cast into a preheated mold at 150° C.

The resulting prepolymer was pliable and adhesive at room temperature (20° C.). Its softening point was close to 5° C. Its viscosity at 80° C. was 5 Pa.s.

With this prepolymer, hot-melt type impregnation (with solvent-free molten prepolymer) of fibrous materials, with, for example, a basis of woven carbon fiber blanket, to produce preimpregnated intermediate components, was possible in the temperature range of 80° to 100° C.

Immediately casting the prepolymer into a mold as indicated above, produced sheets measuring 140×100×4 mm, which were then subjected to the following curing cycle:
100 minutes between 150° C. and 250° C.;
16 hours at 250° C.; and
2 hours at from 250° C. to 25° C.

After demolding, the hardened polymer-based sheets were cut to produce test pieces of appropriate dimensions, on which the following were determined: the glass transition temperature (Tg), the flexural modulus (Mf), the flexural rupture strength (Rf), unnotched CHARPY impact strength (Rc), elongation at rupture under traction (At).

The following results were obtained:

| | | |
|---|---|---|
| Tg: | 280° C., | |
| Mf: | at 20° C.: | 3500 MPa, |
| | at 250° C.: | 1700 MPa, |
| Rf: | at 20° C.: | 130 MPa, |
| | at 250° C.: | 60 MPa, |
| Rc: | at 20° C.: | 12 kJ/m$^2$ |
| At: | at 20° C.: | 2.4% |

By way of a comparative test, the operations described above were reproduced, but omitting the acrylate reactant. The prepolymer obtained under these conditions had a softening point of 60° C. and a viscosity at 80° C. on the order of 2,000 Pa.s, which made it impossible to be used for the solvent-free production of preimpregnated intermediate articles (the prepolymer was too viscous and impregnation of the fibers resulted in considerable deformation of the blanket, which militates against this application).

EXAMPLE 2

Example 1 was repeated, using the following reactants:
(i) stage 1: 82 g (0.229 mole) of N,N'-(4,4'-diphenylmethane)bismaleimide and 18 g (0.064 mole) of 4,4'-diamino-3,3'-diethyl-5,5'-dimethyldiphenylmethane (the ratio r was 3.58/1);
(ii) stage 2: 8 g of N-vinyl-2-pyrrolidone, and
(iii) stage 3: 28 g of the acrylate reactant which was a mixture with a basis of 80 % by weight of an epoxy novolak diacrylate of formula (VIII) wherein $R_6=R_{11}=H$ and t is a number ranging from 2 to 4 and 20 % by weight of trimethylolpropane triacrylate; this reactant is available commercially under the registered trademark EBECRYL 629 from the UCB Company.

The resulting prepolymer was pliable and adhesive at room temperature. Its softening point was close to 10° C. Its viscosity at 80° C. was 10 Pa.s. With this prepolymer, hot-melt type impregnation of fibrous materials was possible at temperature of from 80° C. to 120° C.

The physical and mechanical properties of the molded polymer, hardened and tested as indicated in Example 1, were as follows:

| Tg: | 295° C., | |
|---|---|---|
| Mf: | at 250° C.: | 3800 MPa, |
| | at 250° C.: | 2000 MPa, |
| Rf: | at 20° C.: | 140 MPa, |
| | at 250° C.: | 60 MPa, |
| Rc: | at 20° C.: | 10 kJ/m², |
| At: | at 20° C.: | 2% |

In the absence of acrylate reactant, the resulting prepolymer had a softening point of 60° C. and a viscosity at 80° C. on the order of 2,000 Pa.s, which made it impossible to use it for the solvent-free production of preimpregnated intermediate articles.

EXAMPLE 3

Example 1 was again repeated using the following reactants:

(i) stage 1: 82 g (0.229 mole) of N,N'-(4,4'-diphenylmethane)bismaleimide and 18 g (0.064 mole) of 4,4'-diamino-3,3'-diethyl-5,5'-dimethyldiphenylmethane (the ratio r is 3.58/1);

(ii) stage 2: 5 g of N-vinyl-2-pyrrolidone and 0.025 g of imidazole; the mass of components was permitted to react while being stirred for 6 minutes;

(iii) stage 3: 28 g of the acrylate reactant used in Example 2 above.

The resulting prepolymer wa pliable and adhesive at room temperature. Its softening point was close to 15° C. Its viscosity at 80° C. was 12 Pa.s and hot-melt type impregnation was possible at a temperature of from 80° C. to 120° C.

The physical and mechanical properties of the molded polymer, hardened and tested as indicated in Example 1, were as follows:

| Tg: | 305° C.: | |
|---|---|---|
| Mf: | at 20° C.: | 3800 MPa, |
| | at 250° C.: | 2000 MPa, |
| Rf: | at 20° C.: | 130 MPa, |
| | at 250° C.: | 80 MPa, |
| Rc: | at 20° C.: | 10 kJ/m² |
| At: | at 20° C.: | 1.8% |

In the absence of acrylate reactant, the resulting prepolymer had a softening point of 60° C. and a viscosity at 80° C. again on the order of 2,000 Pa.s.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermosetting imido prepolymer having a melt viscosity of from 0.1 Pa.s to 500 Pa.s, comprising the copolymerizate of:

(a) at least one N,N'-bismaleimide having the formula (I):

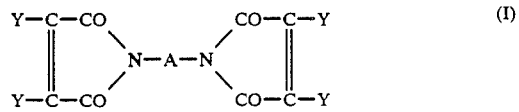

wherein each of the symbols Y, which may be identical or different, is H, $CH_3$ or Cl; and the symbol A is a cyclohexylene; phenylene; 4-methyl-1,3-phenylene; 2-methyl-1,3-phenylene; 5-methyl-1,3-phenylene; or 2,5-diethyl-3-methyl-1,4-phenylene radical; or a radical of the formula:

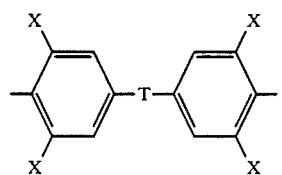

wherein T is a single valence bond or one of the atoms or radicals:

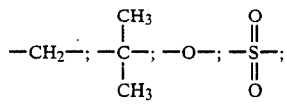

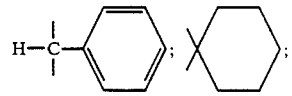

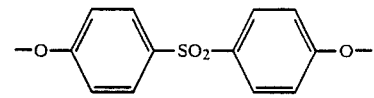

and each of the symbols X, which may be identical or different, is a hydrogen atom or a methyl, ethyl, propyl or isopropyl radical;

(b) at least one hindered diprimary diamine selected from among:

(i) diamines having the general formula (II):

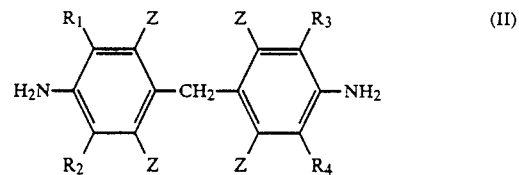

wherein each of the symbols $R_1$, $R_2$, $R_3$ and $R_4$, which may be identical or different, is a methyl, ethyl, propyl or isopropyl radical; and each of the symbols Z, which may be identical or different, is a hydrogen atom or a chlorine atom; or (ii) diamines having the general formula (III):

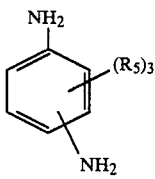

(III)

wherein the amino radicals are in a meta- or para-position with respect to one another; and each of the symbols $R_5$, which may be identical or different, is a methyl, ethyl, propyl or isopropyl radical;

at least one comonomer (c) and/or (d), wherein (c) comprises a vinylpyridine, N-vinyl-2-pyrrolidone, allyl isocyanurate, vinyltetrahydrofuran, or mixtures thereof, and (d) comprises an imidazole compound; and (c) at least one acrylate comonomer having the general formula (IV):

$$(CH_2=CR_6-CO-)_nB \quad (IV)$$

wherein the symbol $R_6$ is a hydrogen atom or a methyl radical; n is an integer or fraction at least equal to 1 and at most equal to 8; and the symbol B is an organic radical of valency n which comprises a saturated linear or branched chain aliphatic radical having from 1 to 30 carbon atoms, which may contain one or more oxygen bridge atoms and/or one or more free hydroxyl functions; an aromatic radical having from 6 to 150 carbon atoms and including a benzene nucleus, which may have one to three substituent alkyl radicals having from 1 to 5 carbon atoms, or several benzene nuclei, optionally substituted as indicated above, linked together by a single valence bond, as inert group or an alkylene radical having from 1 to 3 carbon atoms, such aromatic radical optionally containing one or more oxygen bridge atoms and/or one or more free hydroxyl functions, the free valency or valencies in the aromatic radical B being optionally borne by an aliphatic chain carbon atom and/or a carbon atom in a benzene nucleus.

2. The imido prepolymer as defined by claim 1, said monomer (a) comprising N,N'-meta-phenylenebismaleimide; N,N'-para-phenylenebismaleimide; N,N'-(4,4'-diphenylenemethane) bismaleimide; N,N'-(4,4'-diphenyl ether)bismaleimide; N,N'-(4,4'-diphenyl sulfone)bismaleimide; N,N'-(1,4-cyclohexylene) bismaleimide; N,N'-[4,4'-(1,1-diphenylcyclohexane)]bismaleimide; N,N'-[4,4'-(2,2-diphenylpropane)]bismaleimide; N,N'-(4,4'-triphenylmethane)bismaleimide; N,N'-(2-methyl-1,3-phenylene) bismaleimide; N,N'-(4-methyl-1,3-phenylene)bismaleimide; and N,N'-(5-methyl-1,3-phenylene)bismaleimide; or mixtures thereof.

3. The imido prepolymer as defined by claim 1, said comonomer (b) comprising 4,4'-diamino-3,3',5,5'-tetramethyldiphenylmethane; 4,4'-diamino-3,3',5,5'-tetraethyldiphenylmethane; 4,4'-diamino-3,5-dimethyl-3',5'-diethyldiphenylmethane; 4,4'-diamino-3,3'-diethyl-5,5'-dimethyldiphenylmethane; 4,4'-diamino-3,3',5,5'-tetraisopropyldiphenylmethane; 4,4'-diamino-3,3'-diisopropyl-5,5'-dimethyldiphenylmethane; 4,4'-diamino-2,2'-dichloro-3,3',5,5'-tetraethyldiphenyl-methane; 1,3-diamino-2,4-diethyl-6-methylbenzene; 1,3-diamino-2-methyl-4,6-diethylbenzene; or mixtures thereof.

4. The imido prepolymer as defined by claim 1, said comonomer (e) comprising at least one of (e1), (e2), (e3), (e4) and (e5), in which (e1) is a mono(meth)acrylate and having the formula (IV) wherein n=1; B is a monovalent organic radical of the formula:

$$-CH_2CH_2O)_m-B_1 \quad (VI)$$

in which $B_1$ is a linear or branched chain alkyl radical having from 1 to 6 carbon atoms or a phenyl radical; and m is an integer equal to zero, 1, 2, 3, 4 or 5;

(e2) is a di-(meth)acrylate having the formula (IV) wherein n=2; B is a divalent organic radical of the formula:

$$-CH_2CH_2O)_pB_2(OCH_2CH_2)_q \quad (VII)$$

in which $B_2$ is a divalent, linear or branched chain alkylene radical having from 2 to 9 carbon atoms, optionally containing one or more oxygen bridge atoms or a radical of the formula:

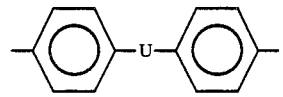

wherein the symbol U is a single valence bond or one of the atoms or radicals:

each of the symbols p and q, which may be identical or different, is an integer equal to zero, 1, 2, 3, 4 or 5;

(e3) is a tri or tetra(meth)acrylate having the formula (IV) wherein n=3 or 4; B is a trivalent or tetravalent linear or branched chain saturated aliphatic radical having from 3 to 20 carbon atoms and optionally containing one or more oxygen bridge atoms and/or one or more free hydroxyl functions;

(e4) is a epoxy novolak (meth)acrylate having the following formula (VIII):

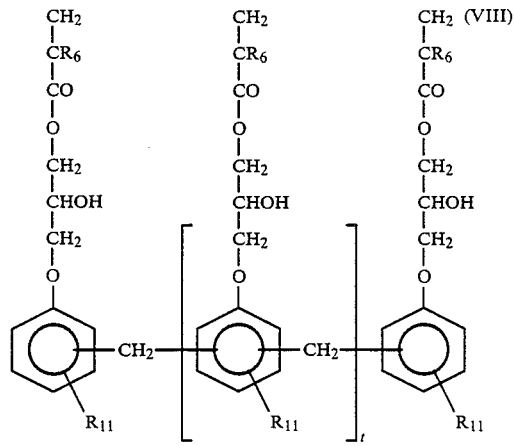

wherein the symbol $R_6$ is as defined in Formula (IV); the symbol $R_{11}$ is a hydrogen atom or a methyl radical; t is an integer or a fraction ranging from 0.1 to 7;

(e5) is a mixture of several acrylates and/or methacrylates of types (e1), (e2), (e3) or (e4), or a mixture of one or more acrylates and/or methacrylates of the above type with one or more acrylates and/or methacrylates of a different type.

5. The imido prepolymer as defined by claim 1, wherein the N',N-bismaleimide(s) (a) and hindered diamine(s) (b) are such that the ratio r:

$$r = \frac{\text{number of moles of bisimide(s) }(a)}{\text{number of moles of diamine(s) }(b)}$$

ranges from 1.1/1 to 20/1.

6. The imido prepolymer as defined by claim 1, comprising a comonomer (c), in an amount of less than 60% of the weight of the comonomers (a)+(b).

7. The imido prepolymer as defined by claim 1, comprising a comonomer (d), in an amount ranging from 0.01 to 1 % by weight of the total weight of the comonomers (a)+(b) (e)+where appropriate (c).

8. The imido prepolymer as defined by claim 1, comprising the comonomer (e) in an amount of from 1 % to 60 % of the total weight of the comonomers (a)+(b)-+(e)+where appropriate (c).

9. A process for the preparation of the imido prepolymer as defined by claim 1, comprising (i) melting the mixture (a)+(b) at a temperature of from 50° C. to 180° C., under stirring; (ii) adding the comonomers (c) and/or (d) to the stirred molten mixture which is maintained at a temperature of from 50° C. and 180° C., and reacting the mixture, under stirring for a period of time of from 1 minute to 20 minutes; and (iii) then quickly introducing the comonomer (e) into the reaction mixture, under stirring and maintained at the temperature of step (ii).

10. The process as defined by claim 9, comprising immediately casting the imido prepolymer upon completion of the step (iii).

11. A shaped article comprising the imido prepolymer as defined by claim 1.

12. The imido prepolymer as defined by claim 1, in cured thermoset state.

13. A prepreg comprising the imido prepolymer as defined by claim 1.

14. A substrate impregnated with the imido prepolymer as defined by claim 1.

* * * * *